US008422535B2

United States Patent
Lim et al.

(10) Patent No.: US 8,422,535 B2
(45) Date of Patent: Apr. 16, 2013

(54) FREQUENCY SELECTIVE DIGITAL TRANSMISSION APPARATUS

(75) Inventors: In Gi Lim, Daejeon (KR); Hyung Il Park, Daejeon (KR); Tae Wook Kang, Daejeon (KR); Chang Hee Hyoung, Daejeon (KR); Sung Weon Kang, Daejeon (KR); Jung Hwan Hwang, Daejeon (KR); Kyung Soo Kim, Daejeon (KR); Jung Bum Kim, Daejeon (KR); Sung Eun Kim, Seoul (KR); Jin-Kyung Kim, Daejeon (KR); Hey Jin Myoung, Daejeon (KR); Seok Bong Hyun, Daejeon (KR); Kyung Hwan Park, Daejeon (KR); Byoung Gun Choi, Daegu (KR); Tae Young Kang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 439 days.

(21) Appl. No.: 12/767,430

(22) Filed: Apr. 26, 2010

(65) Prior Publication Data

US 2010/0272159 A1 Oct. 28, 2010

(30) Foreign Application Priority Data

Apr. 27, 2009 (KR) .................... 10-2009-0036749
Feb. 12, 2010 (KR) .................... 10-2010-0013340

(51) Int. Cl.
*H04B 1/69* (2011.01)
*H04B 7/216* (2006.01)

(52) U.S. Cl.
USPC ............ 375/146; 375/377; 370/342; 370/441

(58) Field of Classification Search .................. 375/130, 375/140, 145, 146, 377; 370/329, 335, 342, 370/441
See application file for complete search history.

(56) References Cited

U.S. PATENT DOCUMENTS

| 6,160,803 A * | 12/2000 | Yuen et al. ................... 370/342 |
| 2004/0202137 A1* | 10/2004 | Gerakoulis ................... 370/335 |
| 2006/0039331 A1 | 2/2006 | Abeta et al. |
| 2008/0049744 A1* | 2/2008 | Kim et al. ................... 370/389 |
| 2010/0172394 A1* | 7/2010 | Lim et al. ................... 375/146 |
| 2011/0150000 A1* | 6/2011 | Park et al. ................... 370/474 |

FOREIGN PATENT DOCUMENTS

| JP | 2001-237803 A | 8/2001 |
| JP | 2009-044698 A | 2/2009 |
| KR | 100829865 B1 | 5/2008 |
| KR | 1020080114451 A | 12/2008 |
| WO | WO 2009/002009 A1 | 12/2008 |

* cited by examiner

*Primary Examiner* — Tesfaldet Bocure (57) ABSTRACT

A frequency selective digital transmission apparatus includes: a preamble transmission processing unit generating a preamble for frame synchronization and spreading the generated preamble with a predetermined spreading code; a header transmission processing unit configuring a header including data attribute information and spreading the header with a predetermined spreading code; a data transmission processing unit performing serial-to-parallel conversion on transmission data according to a selected transmission mode and a spreading scheme and spreading the same with a frequency selective spreading code; and a multiplexing unit multiplexing the preamble, the header, and the data which have been spread by the preamble transmission processing unit, the header transmission processing unit and the data transmission processing unit, respectively, and transmitting the same as digital signals.

13 Claims, 9 Drawing Sheets

Fourth sub-group($W_{32}$ ~ $W_{39}$), SGN=100

| | | | |
|---|---|---|---|
| W32 | 01100110011001100 | 110011001100110011001100110011001 | 10011001100110 |
| W33 | 01100110011001100 | 1100110011001101001100110011001 | 1001100110011001 |
| W34 | 01100110011001101 | 00110011001100110011001100110011001 | 1001100110011001 |
| W35 | 01100110011001101 | 0011001100110010110011001100110 | 1001100110011001 |
| W36 | 01100110100110011 | 001100101100110011001100110011001 | 1001100101100110 |
| W37 | 01100110100110011 | 00110010110011010011001011001101 | 01100110100110011 |
| W38 | 01100110100110011 | 01100110100110011001101001100110 | 1001100101100110 |
| W39 | 01100110100110011 | 01100110100110010110011010011001 | 01100110100110011 |

Fifth sub-group ($W_{40}$ ~ $W_{47}$), SGN=101

| | | | |
|---|---|---|---|
| W40 | 01101001100101100 | 1101001100101100110100110010110 | 0110100110010110 |
| W41 | 01101001100101100 | 01101001100101101001011001101001 | 1001011001101001 |
| W42 | 01101001100101101 | 0010110011010011001011001101001 | 0110100110010110 |
| W43 | 01101001100101101 | 0010110011010010110100110010110 | 1001011001101001 |
| W44 | 01101001011010011 | 001011010010110011010010110100 | 1001011010010110 |
| W45 | 01101001011010011 | 0010110100101101001011010010110 | 0110100101101001 |
| W46 | 01101001011010011 | 0110100101101001100101101001011 | 1001011010010110 |
| W47 | 01101001011010011 | 0110100101101001011010010110101 | 0110100101101001 |

Sixth sub-group ($W_{48}$ ~ $W_{55}$), SGN=110

| | | | |
|---|---|---|---|
| W48 | 01011010010110101 | 0101101001011010010110100101101 | 0101101001011010 |
| W49 | 01011010010110101 | 0101101001011010101001011010010 | 1010010110100101 |
| W50 | 01011010010110101 | 1010010110100101101001011010010 | 0101101001011010 |
| W51 | 01011010010110101 | 1010010110100101010110100101101 | 0101001011010010 |
| W52 | 01011010101001010 | 10101010101010101001011010010110 | 1001010101011010 |
| W53 | 01011010101001010 | 101010101010101011010010101010 | 0101101010100101 |
| W54 | 01011010101001010 | 010110101010010110101010101011 | 1010010101011010 |
| W55 | 01011010101001010 | 01011010101001011010101010100 | 0101101010100101 |

Seventh sub-group ($W_{56}$ ~ $W_{63}$), SGN=110

| | | | |
|---|---|---|---|
| W56 | 01010101101010101 | 0101010101010101001010101101010 | 0101010110101010 |
| W57 | 01010101101010101 | 01010101010101010101001010101 | 1010101010101010 |
| W58 | 01010101101010101 | 1010101001010101101010101010101 | 0101010110101010 |
| W59 | 01010101101010101 | 1010101001010101010101011010101 | 1010101010101010 |
| W60 | 01010101010101010 | 1010101010101010010101010101010 | 1010101010101010 |
| W61 | 01010101010101010 | 10101010101010101010101010101010 | 0101010101010101 |
| W62 | 01010101010101010 | 01010101010101011010101010101010 | 1010101010101010 |
| W63 | 01010101010101010 | 01010101010101010101010101010101 | 0101010101010101 |

FREQUENCY SELECTIVE DIGITAL TRANSMISSION APPARATUS

CROSS-REFERENCE TO RELATED APPLICATIONS

This application claims the priorities of Korean Patent Application Nos. 10-2009-0036749 filed on Apr. 27, 2009 and 10-2010-0013340 filed on Feb. 12, 2010 in the Korean Intellectual Property Office, the disclosures of which are incorporated herein by reference.

BACKGROUND OF THE INVENTION

1. Field of the Invention

The present invention relates to a frequency selective digital transmission apparatus and, more particularly, to a technique of selecting one of a high performance mode, a general mode, and a low power mode according to a symbol rate and a clock in use varying according to various applications, and selectively using one of a high speed spreading scheme employing a frequency selective spreader having a multi-structure providing a high data transmission efficiency and a low speed spreading scheme having a transmission performance superior to a transmission efficiency in each mode, in a frequency selective digital transmission apparatus, which uses a frequency selective spreading code in order to avoid a frequency band to which noise power around a human body is concentrated, compared with other bands, and uses a limited frequency band up to a frequency band at which the strength of a signal transmitted by using the human body as a waveguide is stronger than the strength of a signal radiating to the exterior of the human body.

2. Description of the Related Art

Korean Patent No. 829865, filed in 2006 by the same inventor of the present invention and registered in 2008 and entitled "A human body communication system using a limited pass band and method thereof," discloses a human body communication system implemented by using a pass band limited from 5 MHz band to 40 MHz and performing scrambling, channel coding, interleaving, spreading, and the like, by using a unique user identification information (ID).

Also, Korean Patent Application No. 2007-0087869 filed in 2007 and entitled "Modulation and demodulation method using a frequency selective baseband and apparatus thereof" discloses a frequency selective multi-structure capable of increasing a transmission data rate as well as improving a processing gain of an overall system by using serial-to-parallel conversion, frequency selective baseband transmission, and a limited number of spreading codes.

However, a technique of optimizing a frequency selective digital transmission apparatus in consideration of a clock speed, a frequency band in use, a maximum data rate, power consumption, and the like, appropriate for each application in a human body communication system performing various applications has never before been presented.

SUMMARY OF THE INVENTION

An aspect of the present invention provides a frequency selective digital transmission apparatus capable of selecting one of a high performance mode, a general mode, and a low power mode according to a symbol rate and a clock in use varying according to various applications, and selectively using one of a high speed spreading scheme employing a frequency selective spreader having a multi-structure providing a high data transmission efficiency and a low speed spreading scheme having a transmission performance superior to a transmission efficiency in each mode.

According to an aspect of the present invention, there is provided a frequency selective digital transmission apparatus including: a preamble transmission processing unit generating a preamble for frame synchronization and spreading the generated preamble with a predetermined spreading code; a header transmission processing unit configuring a header including data attribute information and spreading the header with a predetermined spreading code; a data transmission processing unit performing serial-to-parallel conversion on transmission data according to a selected transmission mode and a spreading scheme and spreading the same with a frequency selective spreading code; and a multiplexing unit multiplexing the preamble, the header, and the data which have been spread by the preamble transmission processing unit, the header transmission processing unit and the data transmission processing unit, respectively, and transmitting the same as digital signals.

BRIEF DESCRIPTION OF THE DRAWINGS

The above and other aspects, features and other advantages of the present invention will be more clearly understood from the following detailed description taken in conjunction with the accompanying drawings, in which:

FIG. 6 illustrates the configuration of subgroups of 32-bit Walsh code in use in a high performance mode according to an exemplary embodiment of the present invention;

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

In an exemplary embodiment of the present invention, it is assumed that 64-bit Walsh codes are used as spreading codes in which a dominant frequency exists, a 64 MHz clock and a symbol rate of 2 Msps are used in a high performance mode, a 64 MHz clock and a symbol rate of 1 Msps are used in a general mode, and a 32 MHz clock and a symbol rate of 0.5 Msps are used in a low power mode. However, the Walsh code and the clocks and symbol rates used in each mode are not limited thereto.

A transmission apparatus proposed in an exemplary embodiment of the present invention employs a frequency selective digital transmission (FSDT) scheme. In the FSDT scheme, data is spread in a frequency domain by using a frequency selective spreading code and is transmitted in a digital form. Also, the FSDT scheme has the characteristics that a dominant frequency at which most transmission signals are distributed can be selected by using a particular frequency selective spreading code.

Figure 1:
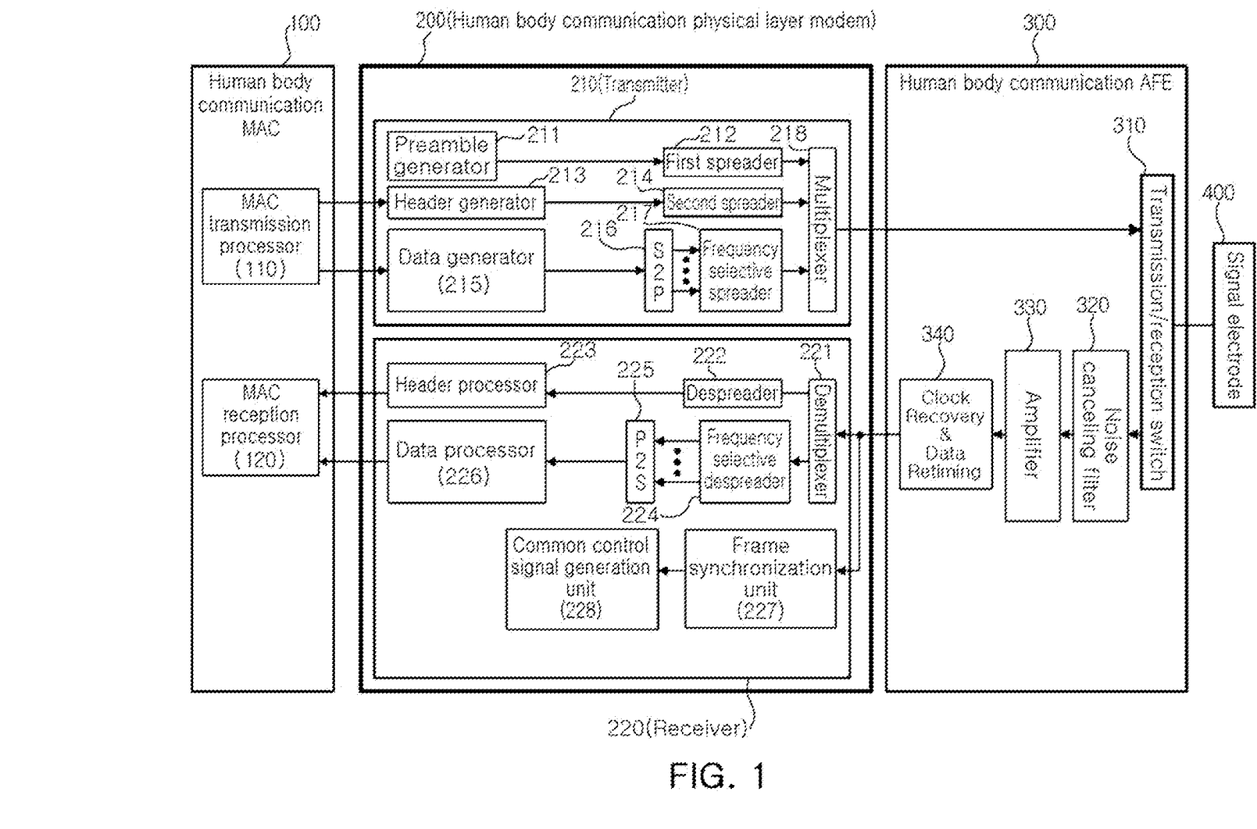
FIG. 1 is a schematic block diagram showing the configuration of a transceiver for human body communication according to an exemplary embodiment of the present invention.

FIG. 1 is a schematic block diagram showing the configuration of a human body communication transceiver according to an exemplary embodiment of the present invention.

As shown in FIG. 1, a human body communication transceiver includes a human body communication medium access control (MAC) 100, a human body communication physical layer modem 200, a human body communication analog front end (AFE) 300, and a signal electrode 400.

The human body communication MAC 100 includes a MAC transmission processor 110 and a MAC reception processor 120. The MAC transmission processor 110 processes transmission data and data attribute information received from an upper layer and delivers the processed transmission data and data attributed information to a transmitter 210 of the human body communication physical layer modem 200. The MAC reception processing unit 210 receives reception data and data attribute information from a receiver 220 of the human body communication physical layer modem 200, processes the reception data and data attribute information, and delivers the processed reception data and data attribute information to an upper layer.

The human body communication physical layer modem 200 includes the transmitter 210 and the receiver 220.

The transmitter 210 includes a preamble generator 211 and a first spreader 212 for processing a preamble transmission, a header generator 213 and a second spreader 214 for processing a header transmission, a data generator 215, a serial-to-parallel converter (S2P) 216, and a frequency selective spreader 217 for processing a data transmission, and a multiplexer 218 for multiplexing the processed preamble, header and data.

The preamble generator 211, set by a predefined initial value, generates a preamble for frame synchronization having a certain length. The generated preamble is input to the first spreader 212 and spread with a predetermined spreading code.

The header generator 213 receives data attribute information, for example, a transmission rate, a modulation scheme, a frequency band, a data length, and the like, of the transmission data from the MAC transmission processing unit 110 of the human body communication MAC 100 to configure a header having a predetermined number of bits and a header check sequence (HCS). The configured header is input to the second spreader 214 and spread with a predetermined spreading code.

The data generator 215 receives the transmission data from the MAC transmission processing unit 110 of the human body communication MAC 100 and outputs the data at a desired time. Also, the data generator 215 performs data control processing for a transmission of variable data, data HCS generation, and the like.

The S2P 216 receives the data output from the data generator 215 and performs N-bit serial-to-parallel conversion on the received data. The serial-to-parallel conversion results in a reduction of a frequency band in use to 1/N, having an advantage in that a larger amount of data can be transmitted within the same frequency band or a larger spreading code gain can be used within the same frequency band to thus transmit high quality data. Also, the S2P 216 may operate at a different clock and a different symbol rate according to one selected from among a high performance mode, a general mode, and a low power mode so as to be optimized to various applications.

The frequency selective spreader 217 receives the N bits, output from the S2P 216, in parallel, and outputs a frequency selective spreading code. Also, the frequency selective spreader 217 may select a high speed spreading scheme and a low speed spreading scheme in each mode. The structure and function of the frequency selective spreader 217 will be described in detail with reference to FIGS. 4, 5, 7, and 8.

The multiplexer 218 outputs the preamble, header, and data which have been spread by the first spreader 212, the second spreader 214, and the frequency selective spreader 217, respectively.

In an exemplary embodiment of the present invention, the use of the frequency selective spreader 217 allows for a digital transmission using a desired frequency band. Also, the output of the multiplexer 218 is 1 bit and is available for a digital direct transmission. Accordingly, the output signal from the transmitter 210 passes through a transmission/reception switch 310, without being processed by an analog transmission unit such as a digital-analog converter, an intermediate frequency (IF) converter, and the like, and is input to the signal electrode 400 so as to be transmitted to a human body.

In FIG. 1, the header generator 213 and the second spreader 214, namely, the header transmission processing units, and the data generator 215, the serial-to-parallel converter (S2P) 216, and the frequency selective spreader 217, namely, the data transmission processing units, are illustrated to be separated, but the header transmission processing units and the data transmission processing units may be integrated to be implemented as a single header/data transmission processing unit. In this case, the header/data transmission processing unit includes a header/data generator, an S2P, and a frequency selective spreader. The header/data generator may perform all the functions of the header generator 213 and the data generator 215 as described above, and its outputs may be sequentially input to the S2P and the frequency selective spreader, so that a header and data can be transmitted according to a frequency selective spreading scheme.

The receiver 220 performs reverse functions of the above-described transmitter 210. The receiver 220 includes a demultiplexer 221, a despreader 222, a header processor 223, a frequency selective despreader 224, a parallel-serial converter (P2S) 225, a data processor 226, a frame synchronization unit 227, and a common control signal generation unit 228. The operation of receiving a signal from the human body communication AFE 300 and processing it is as follows.

A reception signal input via the signal electrode 400 passes through the transmission/reception switch 310 and a noise canceling filter 320 canceling noise added during a human body transmission, and is then amplified into a signal having a desired magnitude by an amplifier 330. The amplified reception signal is input to a clock recovery & data retiming (CDR) 340, in which a timing synchronization of the amplified reception signal is matched with a reception stage clock and a frequency offset of the amplified reception signal is compensated. The clock and the reception signal, which have undergone time synchronization and frequency offset compensation, are input to the receiver 220 of the human body communication physical layer modem 200. In this case, if a selected transmission mode is the high performance mode or the general mode, the CDR 340 outputs a clock of 64 MHz, and when the selected transmission mode is the low power mode, the CDR 340 outputs a clock of 32 MHz, obtained by dividing 64 MHz by 2.

First, the reception signal, which has been input to the receiver 220 before frame synchronization, is input to the frame synchronization unit 227 and frame synchronization using a preamble is performed on the reception signal.

When frame synchronization is acquired by the frame synchronization unit 227, the demultiplexer 221 separately outputs a header part and a data part of the reception signal.

The header part output from the demultiplexer 221 is input to the header processor 223 through the despreader 222, and the header processor 223 checks an HCS included in the header, extracts data attribute information of the reception data from the header, and transmits the extracted data attribute information to the MAC reception processing unit 120.

The data part output from the demultiplexer 221 is input to the frequency selective despreader 224. The frequency selective despreader 224 calculates a correlation value and outputs data having the greatest correlation value as N bits according to a selected transmission mode. The N-bit data output from the frequency selective dispreading unit 224 is input to the P2S 225, converted into serial data, which is then input to the data processor 226. The data processor 226 performs data HCS checking on the received data and transmits the same to the MAC reception processor 120.

If the header transmission processing units and the data transmission processing units in the transmitter 210 are integrated so the header and data are transmitted together, according to the frequency selective spreading scheme, then the units for processing the header and data in the receiver 220 are integrally implemented into a frequency selective despreader, a P2S and a header/data processor, so that the header and data can be processed together according to a frequency selective dispreading scheme.

Figure 2:
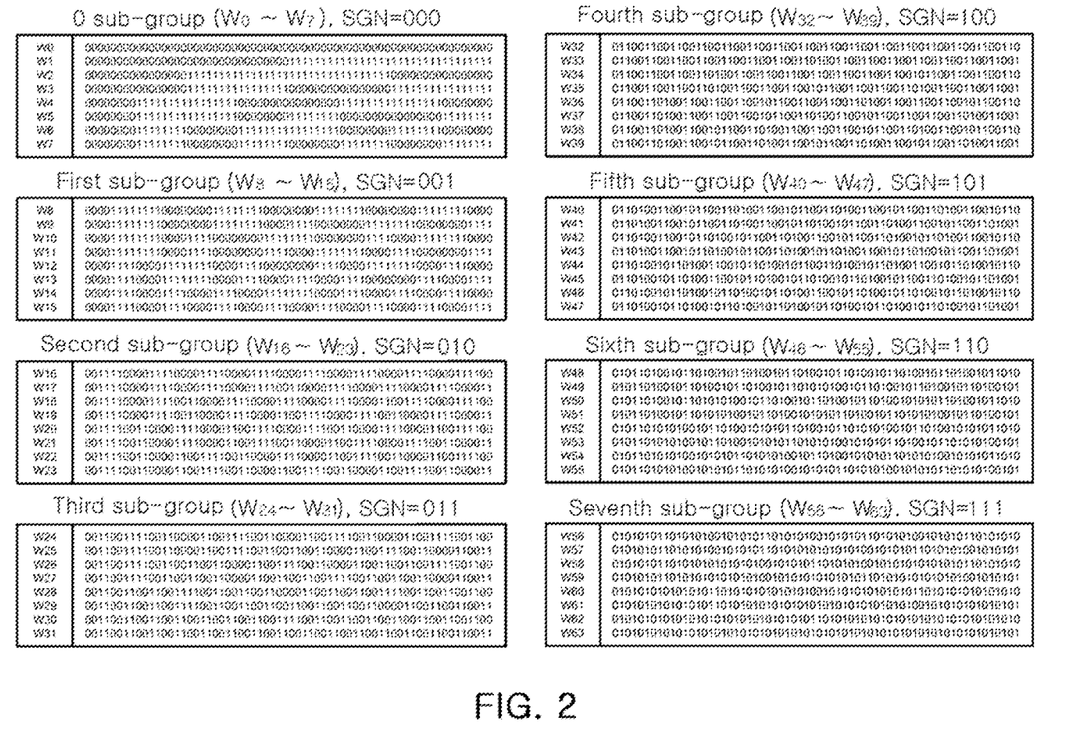
FIG. 2 illustrates the configuration of subgroups of 64-bit Walsh codes according to an exemplary embodiment of the present invention.

FIG. 2 illustrates the configuration of subgroups of 64-bit Walsh codes according to an exemplary embodiment of the present invention.

The 64-bit Walsh codes from $W_0$ to $W_{63}$ have the characteristic that a usage frequency band is precisely divided into 64 sections and the most dominant frequency (fd) of each Walsh code is sequentially mapped to the divided frequencies.

In the present exemplary embodiment, 64-bit Walsh codes are used as spreading codes, which are grouped by eight Walsh codes into eight sub-groups. In order to avoid a low frequency band to which noise power is concentrated, compared with other bands according to a measurement of noise characteristics near or around a human body, only the upper four sub-groups are in use. The fourth sub-groups (SGN="100") are defined as $W_{32}$~$W_{39}$, the fifth sub-groups (SGN="101") are defined as $W_{40}$~$W_{47}$, the sixth sub-groups (SGN="110") are defined as $W_{48}$~$W_{55}$, and the seventh sub-groups (SGN="111") are defined as $W_{56}$~$S_{63}$. The SGN values of the respective sub-groups are 3-bit binary values, each indicating the sub-group number, which are used in the frequency selective spreader. However, the spreading codes in use and the number of sub-groups are not limited thereto, and a total of $2^N$ (N is a real number) number of spreading codes may be divided by $2^M$ (M is a real number and M<N) to generate sub-groups, among which P number of sub-groups may be selectively used.

Figure 3A:
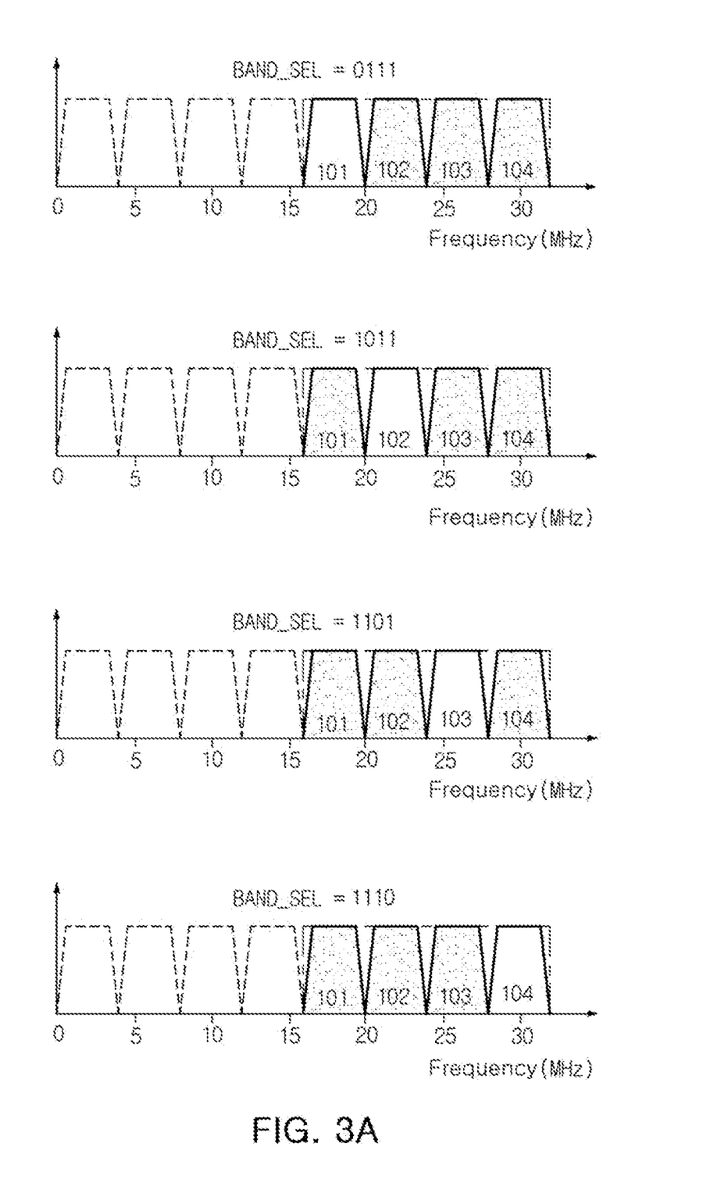
FIGS. 3A and 3B illustrate a frequency selecting method according to an exemplary embodiment of the present invention.
Figure 3B:
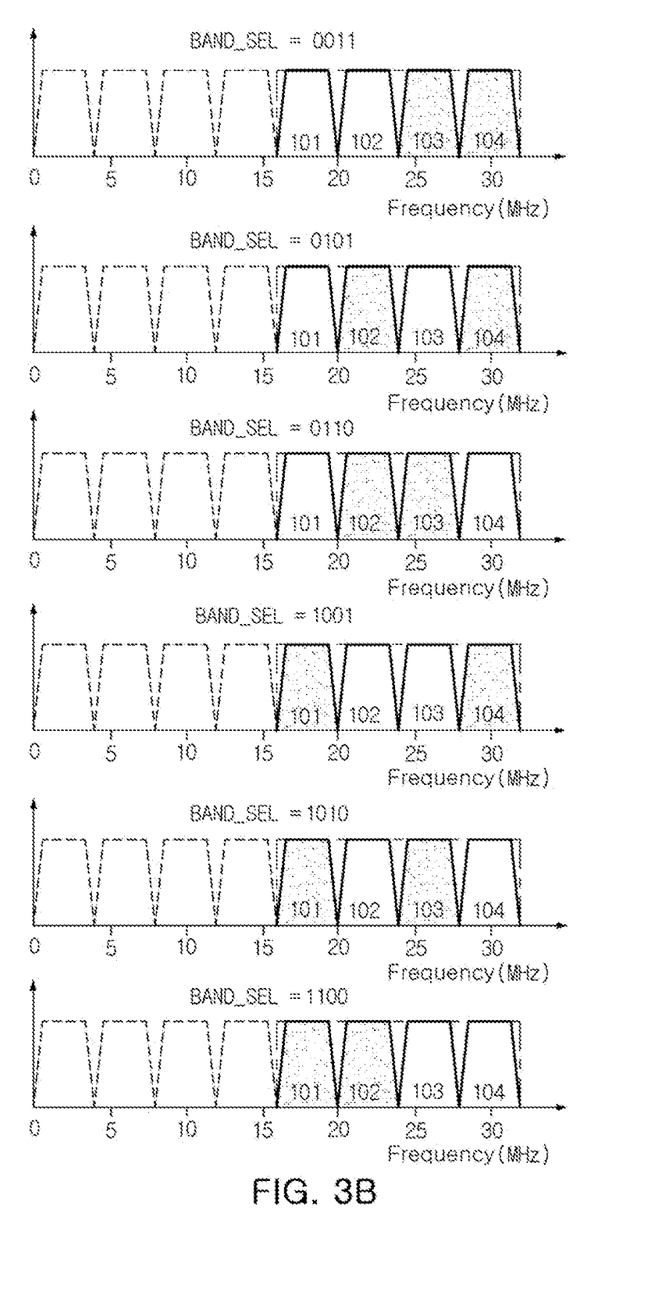

FIGS. 3A and 3B illustrate a frequency selecting method according to an exemplary embodiment of the present invention.

According to an exemplary embodiment of the present invention, a high speed frequency selective spreader using a high speed spreading scheme selectively uses three among four sub-groups as shown in FIG. 3A, and a low speed frequency selective spreader using a low speed spreading scheme selectively uses two among four sub-groups as shown in FIG. 3B. Also, in order to select sub-groups to be used, four frequency band control bits (BAND_SEL) are used.

In detail, in case of the high speed frequency selective spreader, the four frequency band control bits (BAND_SEL) have four types of values: 0111, 1011, 1101, and 1110. Also, in case of the low speed frequency selective spreader, the four frequency band control bits (BAND_SEL) have six types of values: 0011, 0101, 0110, 1001, 1010, and 1100. In this case, When each bit value of the four frequency band control bits (BAND_SEL) is 0, it means not to select a corresponding sub-group, and when each bit value of the four frequency band control bits (BAND_SEL) is 1, it means, to select a corresponding sub-group. In other words, when the four frequency band control bits (BAND_SEL) in the high speed frequency selective spreader is 0111, the fifth sub-group (SGN="101"), the sixth sub-group (SGN="110"), and the seventh sub-group (SGN="111"), as shown in FIG. 2, are selected, and when the four frequency band control bits (BAND_SEL) in the low speed frequency selective spreader is 0011, the sixth (SGN="110") and the seventh sub-group (SGN="111") are selected.

Figure 4:
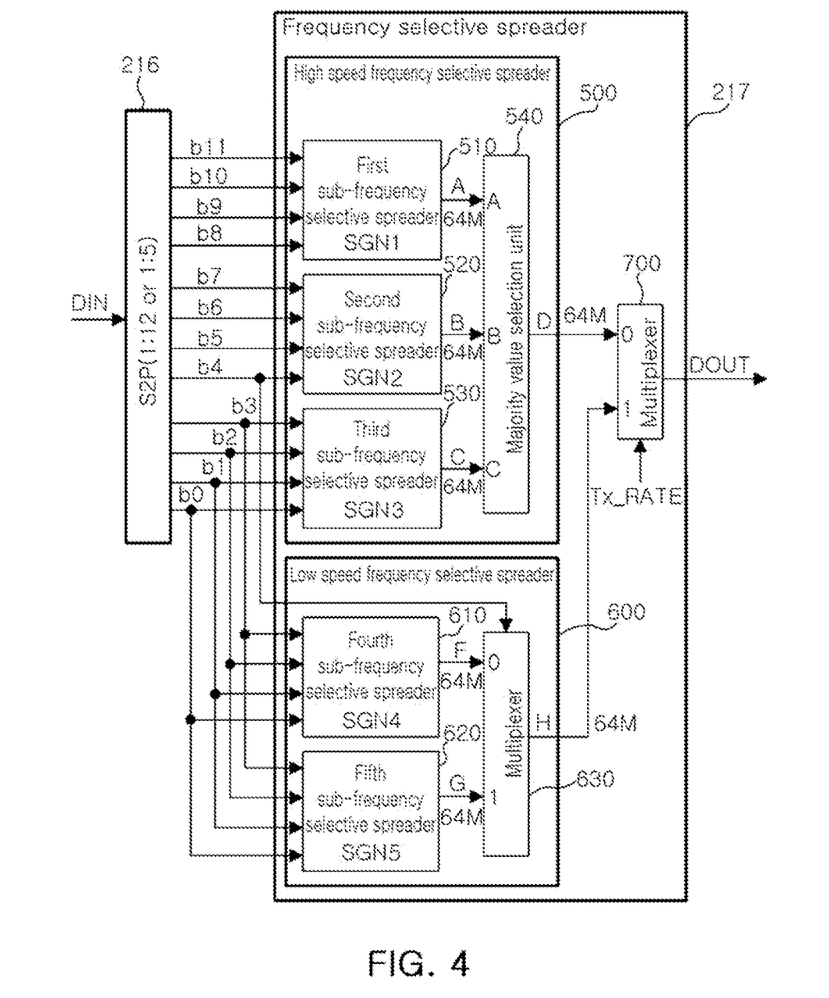
FIG. 4 is a schematic block diagram showing the structure of a frequency selective spreader according to an exemplary embodiment of the present invention.

FIG. 4 is a schematic block diagram showing the structure of a frequency selective spreader according to an exemplary embodiment of the present'invention.

As shown in FIG. 4, the frequency selective spreader 217 includes a high speed frequency selective spreader 500 using a high speed spreading scheme to enhance a data transmission efficiency, a low speed frequency selective spreader 600 using a low speed spreading scheme in order to provide a good transmission performance, rather than a data transmission efficiency, and a multiplexer 700 selectively outputting one of output values of the high speed frequency selective spreader 500 and the low speed frequency selective spreader 600 according to a selected spreading scheme.

The high speed frequency selective spreader 500 includes first to third sub-frequency selective spreaders 510, 520, and 530, and a majority value selection unit 540. The low speed frequency selective spreader 600 includes fourth and fifth sub-frequency selective spreaders 610 and 620, and a multiplexer 630.

The operation of the frequency selective spreader 217 according to a selected transmission mode (i.e., the general mode or the low power mode) and a spreading scheme (i.e., the high speed spreading scheme or the low speed spreading scheme) will now be described in detail.

1) In the Case that the General Mode (64 MHz Clock and Symbol Rate of 1 Msps) and the High Speed Spreading Scheme are Selected The S2P 216 converts input serial data DIN into parallel data of P*(M+1) bits, and outputs the same. Thereafter, the P number of sub-frequency selective spreaders 510, 520, and 530 belonging to the high speed frequency selective spreader 500 of the frequency selective spreader 217 receive (M+1) number of data bits, select one of $2^M$ number of spreading codes in a corresponding sub-group by using M number of data bits, and XOR the remnant 1 bit among the (M+1) number of data bits to the selected value to acquire spreading codes, respectively. Namely, P number of spreading codes are acquired through the P number of sub-frequency selective spreaders 510, 520, and 530. Thereafter, the majority value selection unit 540 selects a majority value from among the P number of spreading codes which have been acquired through the P number of sub-frequency selective spreaders 510, 520, and 530 to generate transmission data including the majority value.

In detail, for example, when the four frequency band control bits (BAND_SEL) are set to be 0111, the DIN, the signal input to the S2P 216, has a maximum 12 Mbps data rate. The S2P 216 performs serial-to-parallel conversion on the input signal DIN in the ratio of 1:12 and outputs 12-bit parallel symbols of b11, b10, b0 at 1 Msps. The output parallel symbols are input to the high speed frequency selective spreader 500 of the frequency selective spreader 217.

Because the four frequency band control bits (BAND_SEL) are 0111, the fifth sub-group (SGN="101"), the sixth sub-group (SGN="110"), and the seventh sub-group (SGN="111") are selected, and accordingly, the SGN1 to SGN3 values in the first to third sub-frequency selective spreaders are 101, 110, and 111.

The first sub-frequency selective spreader 510 uses input bits b11, b10, b9, and b8 and the SGN1 value 101, selects one of the eight Walsh codes ($W_{40}$~$W_{47}$) of the fifth sub-group by using 3 bits of b11, b10, and b9, and XORs the selected value with b8 to output 64 bits (A) in the form of a 1 bit stream.

The second sub-frequency selective spreader 520 uses input bits b7, b6, b5, and b4 and the SGN2 value 110, selects one of eight Walsh codes $W_{48}$~$W_{55}$ of the sixth sub-group by using 3 bits of b7, b6, and b5, and XORs the selected value with b4 to output 64 bits (B) in the form of a 1 bit stream.

The third sub-frequency selective spreader 530 uses input bits b3, b2, b1, and b0 and the SGN3 value 111, selects one of eight Walsh codes $W_{56}$~$W_{63}$ of the seventh sub-group by using 3 bits of b3, b2, and b1, and XORs the selected value with b0 to output 64 bits (C) in the form of a 1 bit stream.

The majority value selection unit 540 receives the 3 bit streams of A, B, and C output from the first to third sub-frequency selective spreaders 510 to 530, selects a majority value according to Equation 1 shown below, and outputs a result value D. In Equation 1, 'or' indicates an OR gate and 'and' indicates an AND gate.

[Equation 1]

$$D = (A \text{ and } B) \text{ or } (B \text{ and } C) \text{ or } (C \text{ and } A)$$

Meanwhile, a Tx_RATE control bit of the multiplexer has a value of 0 when the high speed spreading scheme is selected, and has a value of 1 when the low speed spreading scheme is selected. In the present exemplary embodiment, the Tx_RATE control bit has the value of 0, and accordingly, the output value D of the high speed frequency selective spreader 500 is selectively output, as an output DOUT of the frequency selective spreader 217.

2) In the Case that the General Mode (64 MHz Clock and Symbol Rate of 1 Msps) and the Low Speed Spreading Scheme are Selected The S2P 216 converts input serial data DIN into parallel data of S+(M+1) bits and outputs the same. Thereafter, the Q number of sub-frequency selective spreaders 610 and 620 belonging to the low speed frequency selective spreader 600 of the frequency selective spreader 217 receive (M+1) number of data bits, select one of $2^M$ number of spreading codes in a corresponding sub-group by using M number of data bits, and XOR the remnant 1 bit among the (M+1) number of data bits to the selected value to acquire spreading codes, respectively. Namely, Q number of spreading codes are acquired through the Q number of sub-frequency selective spreaders 610 and 620. Thereafter, the multiplexer 630 selects one spreading code from among the Q number of spreading codes, which have been acquired through the Q number of sub-frequency selective spreaders 610 and 620, by using S bits among input data bits to thus generate transmission data.

In detail, for example, when the four frequency band control bits (BAND_SEL) are set to be 0011, the DIN, the signal input to the S2P 216, has a maximum 5 Mbps data rate. The S2P 216 performs serial-to-parallel conversion on the input signal DIN in the ratio of 1:5 and outputs 5-bit parallel symbols of b4, b3, b0 at 1 Msps. The output parallel symbols are input to the low speed frequency selective spreader 600 of the frequency selective spreader 217.

Because the four frequency band control bits (BAND_SEL) are 0011, the sixth sub-group (SGN="110") and the seventh sub-group (SGN="111") are selected, and accordingly, the SGN4 and SGN5 values in the fourth and fifth sub-frequency selective spreaders are 110, and 111.

The fourth sub-frequency selective spreader 610 uses input bits b3, b2, b1, and b0 and the SGN4 value 110, selects one of the eight Walsh codes ($W_{48}$~$W_{55}$) of the sixth sub-group by using 3 bits of b3, b2, and b1, and XORs the selected value with b0 to output 64 bits (F) in the form of a 1 bit stream.

The fifth sub-frequency selective spreader 620 uses input bits b3, b2, b1, and b0 and the SGN5 value 111, selects one of eight Walsh codes $W_{56}$~$W_{63}$ of the seventh sub-group by using 3 bits of b3, b2, and b1, and XORs the selected value with b0 to output 64 bits (G) in the form of a 1 bit stream.

The multiplexer 630 receives the 2 bit streams of F and G output from the fourth and fifth sub-frequency selective spreaders 610 and 620 and also receives b4 among the outputs from the S2P 216. When b4 is 0, the multiplexer 630 selects the output F of the fourth sub-frequency selective spreader 610 and outputs it as an output H of the low speed frequency selective spreader 600, and when b4 is 1, the multiplexer 630 selects the output G of the fifth sub-frequency selective spreader 620 and outputs it as the output H of the low speed frequency selective spreader 600.

In the present exemplary embodiment, the Tx_RATE control bit has the value of 1, and accordingly, the output value H of the low speed frequency selective spreader 600 is selected by the multiplexer 700 and output, as the output DOUT of the frequency selective spreader 217.

3) In the Case that the Low Power Mode (32 MHz Clock and Symbol Rate of 0.5 Msps) and the High Speed Spreading Scheme are Selected When the four frequency band control bits (BAND_SEL) are set to be 0111, the DIN, the signal input to the S2P 216, has a maximum 6 Mbps data rate. The S2P 216 performs serial-to-parallel conversion on the input signal DIN in the ratio of 1:12 and outputs 12-bit parallel symbols of b11, b10, ..., b0 at 0.5 Msps. The follow-up operation of the frequency selective spreader 217 is performed in the same manner as those of the case where the general mode and the high speed spreading scheme are selected, so a detailed description thereof will be omitted.

4) In the Case that the Low Power Mode (32 MHz Clock and Symbol Rate of 0.5 Msps) and the Low Speed spreading scheme are selected When the four frequency band control bits (BAND_SEL) are set to be 0011, the DIN, the signal input to the S2P 216, has a maximum 2.5 Mbps data rate. The S2P 216 performs serial-to-parallel conversion on the input signal DIN in the ratio of 1:5 and outputs 5-bit parallel symbols of b4, b3, b0 at 0.5 Msps. The follow-up operation of the frequency selective spreader 217 is performed in the same manner as those of the case in which the general mode and the low speed spreading scheme are selected, so a detailed description thereof will be omitted.

Figure 5:
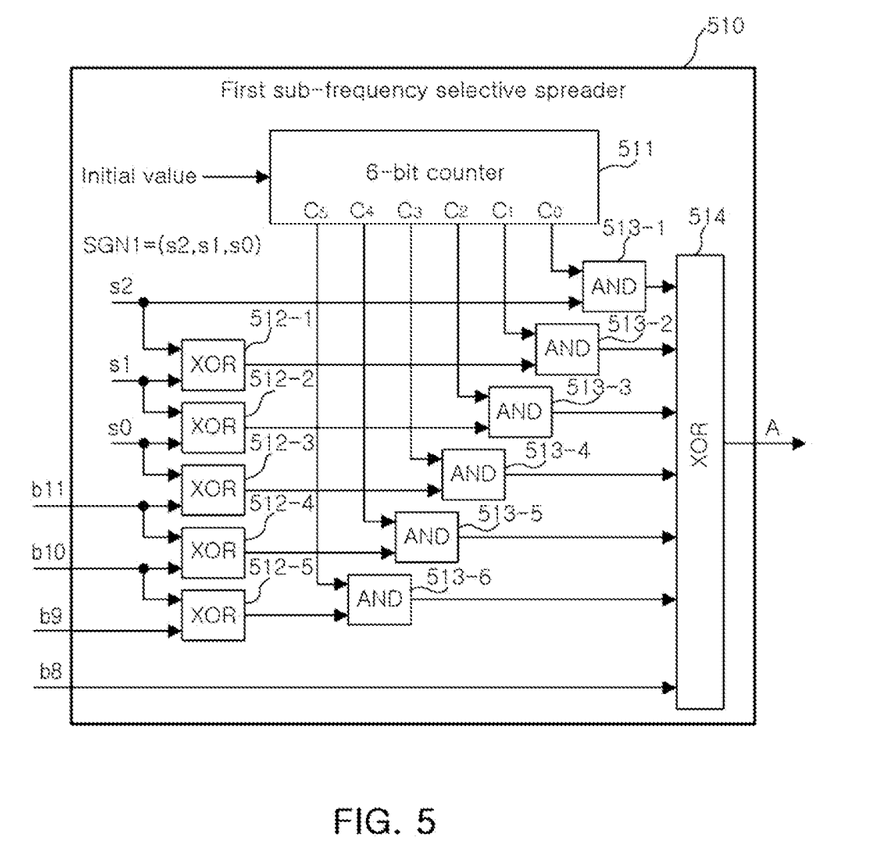
FIG. 5 is a schematic block diagram showing the structure of a sub-frequency selective spreader according to an exemplary embodiment of the present invention.

FIG. 5 is a schematic block diagram showing the structure of a sub-frequency selective spreader according to an exemplary embodiment of the present invention.

As described above, assuming that the general mode and the high speed spreading scheme are selected and the four frequency band control bits (BAND_SEL) values are 0111, one (64 bits) of eight Walsh codes of the fifth sub-group (SGN="101") is generated in the first sub-frequency selective spreader 510 according to the input bits b11, b10, and b9 and XORed with b8 so as to be sequentially output as a 1 bit stream (A). In this case, the SGN1 (s2, s1, s0) value in use is "101", the SGN value of the fifth sub-group. Also, when the low power mode and high speed spreading scheme are selected, 64 bits are generated and outputted in the form of a 1 bit stream in the same manner as that of the general mode, except that a 32 MHz clock is used.

The first sub-frequency selective spreader 510 includes a 6-bit counter 511, six XOR logic circuits 512-1 to 512-5 and 514, and six AND logic circuits 513-1 to 513-6, and has three frequency selective control bits (s2, s1, and s0) and four input bits b11, b10, b9, and b8.

The 6-bit counter 511 is reset to an initial value of 0 at every symbol period in order to count 0 to 63 in the general mode and the low power mode.

One of the eight Walsh codes included in a corresponding sub-group is generated by using the three frequency selective control bits s2, s1, and s0 and the three bits b11, b10, and b9 among the input bits, and b8 among the input bits is XORed with the generated Walsh code so as to be output as an output signal (A) in the form of a 1 bit stream.

The five XOR logic circuits 512-1 to 512-5 are used for gray indexing. The six AND logic circuits 513-1 to 513-6 receive $C_5$ to $C_0$, the output from the 6-bit counter 511, s2, the most significant bit (MSB) of the frequency selective control bits, and output bits of the five XOR logic circuits 512-1 to 512-5. Also, the one XOR logic circuit 514 is to XOR outputs from the six AND logic circuits 513-1 to 513-6 and b8.

FIG. 6 illustrates the configuration of subgroups of 32-bit Walsh code in use in a high performance mode according to an exemplary embodiment of the present invention.

In the high performance mode, a symbol rate input to the frequency selective spreader 217 is 2 Mbps, double that of the general mode, 1 Mbps. Thus, the frequency selective spreader 217 using the same clock in the high performance mode performs spreading by using only 32-bit Walsh codes, among the 64-bit Walsh codes included in a selected sub-group, to fit the symbol rate.

For example, when the 64-bit Walsh codes are defined as Wn=[w0, w1, w2, ..., w63], one of four sets of Whn1=[w16, w17, ..., w47], Whn2=[w32, w33, ..., w63], Whn3=[w8, w9, ..., w23, w40, w41, ..., w55], and Whn4=[w16, w17, ..., w31, w48, w49, ..., w63] is selectively used as the 32-bit Walsh codes in the high performance mode.

In the following description, it is assumed that 32 bits, namely, Whn1=[w16, w17, ..., w47], positioned in the middle, surrounded by a solid line as shown in FIG. 6, of the 64-bit Walsh codes are used. Namely, it is assumed that, when the number of output bits of the Walsh codes is N, N/2 number of Walsh codes positioned in the middle of the N-bit Walsh codes are used.

The characteristics of the selected 32-bit Walsh codes are that each of the 32-bit Walsh codes have different values and, has orthogonality, but when 0 and 1 of the 32-bit Walsh codes are reversed through XORing, likewise in both the general mode and the low power mode, it happens that they overlap with non-reversed Walsh codes. For example, selected 32-bit Walsh codes of W32, "01100110011001100110011001100110" are precisely identical with reversed values of selected 32-bit Walsh codes of W34, "10011001100110011001100110011001". This happens when only 32 bits among 64 bits are selected and transmitted. Due to this phenomenon, in the high performance mode in which only 32 bits of the 64-bit Walsh codes are used to be spread and transmitted at the doubled symbol rate, the reversed output values through XORing by using the least significant bit (LSB) of the four input bits in the sub-frequency selective spreader in the general mode and the low power mode cannot be used.

Figure 7:
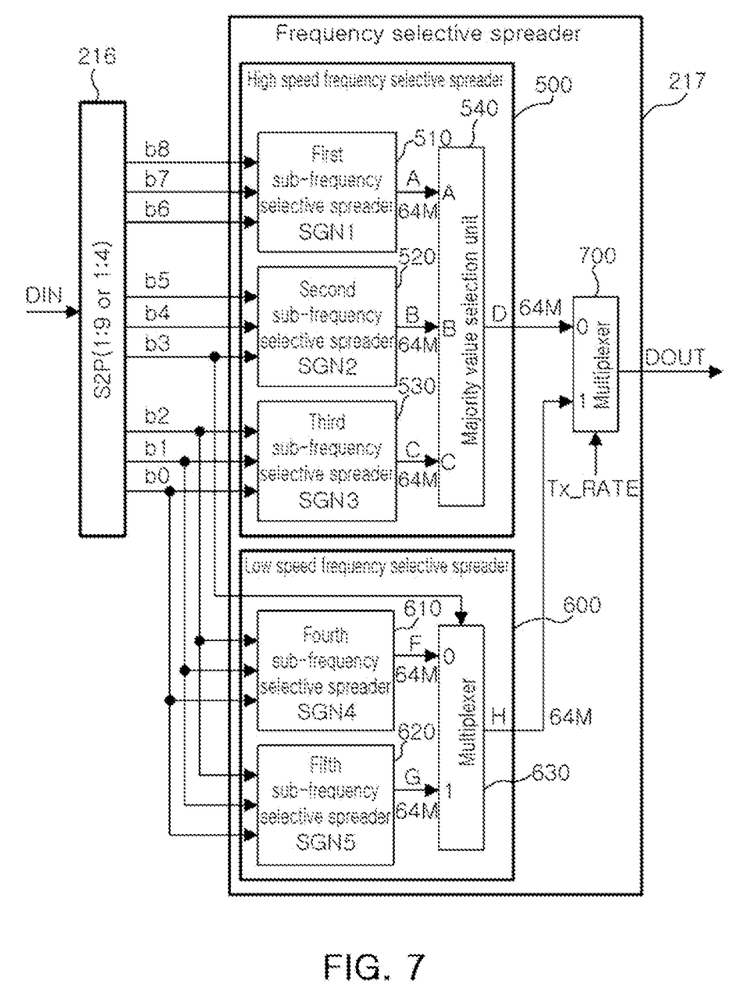
FIG. 7 is a schematic block diagram showing the structure of a frequency selective spreader in the high performance mode according to an exemplary embodiment of the present invention.

FIG. 7 is a schematic block diagram showing the structure of a frequency selective spreader in the high performance mode according to an exemplary embodiment of the present invention.

The frequency selective spreader 217 also includes a high speed frequency selective spreader 500 using a high speed spreading scheme to thereby enhance a data transmission efficiency, a low speed frequency selective spreader 600 using a low speed spreading scheme in order to provide a good transmission performance, rather than a data transmission efficiency, and a multiplexer 700 selectively outputting one of output values of the high speed frequency selective spreader 500 and the low speed frequency selective spreader 600. Also, the high speed frequency selective spreader 500 includes first to third sub-frequency selective spreaders 510, 520, and 530, and a majority value selection unit 540. The low speed frequency selective spreader 600 includes fourth and fifth sub-frequency selective spreaders 610 and 620, and a multiplexer 630.

The operation of the frequency selective spreader 217 according to a selected spreading scheme mode (i.e., the high speed spreading scheme or the low speed spreading scheme) will now be described in detail.

1) In the Case that the High Performance Mode (64 MHz Clock and Symbol Rate of 2 Msps) and the High Speed Spreading Scheme are Selected The S2P 216 converts input serial data DIN into parallel data of P*M bits, and outputs the same. Thereafter, the P number of sub-frequency selective spreaders 510, 520, and 530 belonging to the high speed frequency selective spreader 500 of the frequency selective spreader 217 receive M number of data bits, and select one of $2^M$ number of spreading codes in a corresponding sub-group by using the M number of data bits. Namely, P number of spreading codes are selected through the P number of sub-frequency selective spreaders 510, 520, and 530. Thereafter, the majority value selection unit 540 selects a majority value from among the P number of spreading codes which have been acquired through the P number of sub-frequency selective spreaders 510, 520, and 530 to generate transmission data including the majority value.

In detail, for example, when the four frequency band control bits (BAND_SEL) are set to be 0111, the DIN, the signal input to the S2P 216, has a maximum 18 Mbps data rate. The S2P 216 performs serial-to-parallel conversion on the input signal DIN in the ratio of 1:9 and outputs 9-bit parallel symbols of b8, b7, ... , b0 at 2 Msps. The output parallel symbols are input to the high speed frequency selective spreader 500 of the frequency selective spreader 217.

Because the four frequency band control bits (BAND_SEL) are 0111, the fifth sub-group (SGN="101"), the sixth sub-group (SGN="110"), and the seventh sub-group (SGN="111") are selected, and accordingly, the SGN1 to SGN3 values in the first to third sub-frequency selective spreaders are 101, 110, and 111.

The first sub-frequency selective spreader 510 selects one of the eight Walsh codes $W_{40}$~$W_{47}$ of the fifth sub-group by using the input bits b8, b7, and b6 and the SGN1 value 101 and outputs 32 bits (A), among the selected 64 bits, in the form of a 1 bit stream.

The second sub-frequency selective spreader 520 selects one of eight Walsh codes $W_{48}$~$W_{55}$ of the sixth sub-group by using input bits b5, b4, and b3 and the SGN2 value 110, and outputs 32 bits (B), among the selected 64 bits, in the form of a 1 bit stream.

The third sub-frequency selective spreader 530 selects one of eight Walsh codes $W_{56}$~$W_{63}$ of the seventh sub-group by using input bits b2, b1, and b0 and the SGN3 value 111 and outputs 32 bits (C), among the selected 64 bits, in the form of a 1 bit stream.

The majority value selection unit 540 receives the 3 bit streams of A, B, and C output from the first to third sub-frequency selective spreaders 510 to 530, calculates the Equation 1 shown above, and outputs a result value D.

In the present exemplary embodiment, the Tx_RATE control bit has the value of 0, and accordingly, the output value D of the high speed frequency selective spreader 500 is selectively output, as an output DOUT of the frequency selective spreader 217.

2) In the Case that the High Performance Mode (64 MHz Clock and Symbol Rate of 2 Msps) and the Low Speed Spreading Scheme are Selected The S2P 216 converts input serial data DIN into parallel data of S+M bits and outputs the same. Thereafter, the Q number of sub-frequency selective spreaders 610 and 620 belonging to the low speed frequency selective spreader 600 of the frequency selective spreader 217 receive M number of data bits, and select one of $2^M$ number of spreading codes in a corresponding sub-group by using the M number of data bits. Namely, Q number of spreading codes are acquired through the Q number of sub-frequency selective spreaders 610 and 620. Thereafter, the multiplexer 630 selects one spreading code from among the Q number of spreading codes, which have been acquired through the Q number of sub-frequency selective spreaders 610 and 620, by using S bits among input data bits to thus generate transmission data.

In detail, for example, when the four frequency band control bits (BAND_SEL) are set to be 0011, the DIN, the signal input to the S2P 216, has a maximum 8 Mbps data rate. The S2P 216 performs serial-to-parallel conversion on the input signal DIN in the ratio of 1:4 and outputs 4-bit parallel symbols of b3, b2, ... , b0, at 2 Msps. The output parallel symbols are input to the low speed frequency selective spreader 600 of the frequency selective spreader 217.

Because the four frequency band control bits (BAND_SEL) are 0011, the sixth sub-group (SGN="110") and the seventh sub-group (SGN="111") are selected, and accordingly, the SGN4 and SGN5 values in the fourth and fifth sub-frequency selective spreaders are 110, and 111.

The fourth sub-frequency selective spreader 610 selects one of the eight Walsh codes $W_{48}$~$W_{55}$ of the sixth sub-group by using input bits b2, b1, and b0 and the SGN4 value 110 and outputs 32 bits (F), among the selected 64 bits, in the form of a 1 bit stream.

The fifth sub-frequency selective spreader 620 selects one of eight Walsh codes $W_{56}$~$W_{63}$ of the seventh sub-group by using input bits b2, b1, and b0 and the SGN5 value 111 and outputs 32 bits (G), among the selected 64 bits, in the form of a 1 bit stream.

The multiplexer 630 receives the 2 bit streams of F and G output from the fourth and fifth sub-frequency selective spreaders 610 and 620 and also receives b3 among the outputs from the S2P 216. When b3 is 0, the multiplexer 630 selects the output F of the fourth sub-frequency selective spreader 610 and outputs it as an output H of the low speed frequency selective spreader 600, and when b3 is 1, the multiplexer 630 selects the output G of the fifth sub-frequency selective spreader 620 and outputs it as the output H of the low speed frequency selective spreader 600.

In the present exemplary embodiment, the Tx_RATE control bit has the value 1, and accordingly, the output value H of the low speed frequency selective spreader 600 is selected by the multiplexer 700 and output, as the output DOUT of the frequency selective spreader 217.

Figure 8:
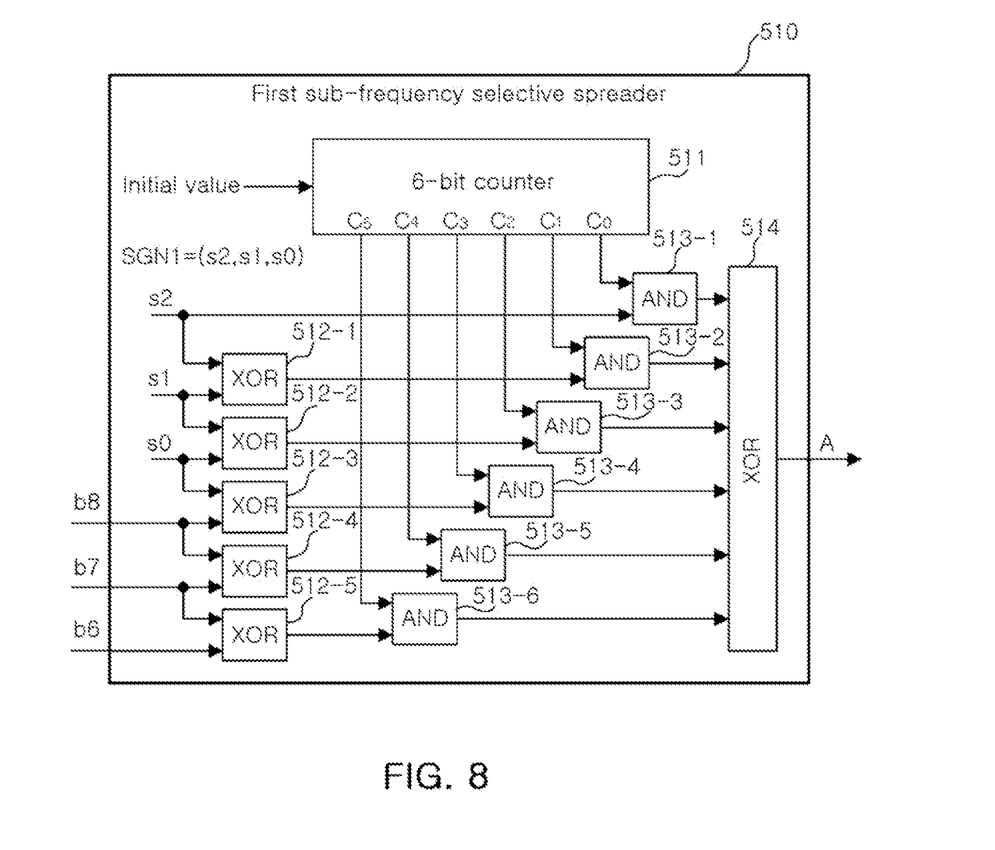
FIG. 8 is a schematic block diagram showing the structure of a sub-frequency selective spreader in the high performance mode according to an exemplary embodiment of the present invention.

FIG. 8 is a schematic block diagram showing the structure of a sub-frequency selective spreader in the high performance mode according to an exemplary embodiment of the present invention.

The sub-frequency selective spreader in the high performance has three input bits unlike in the general mode, and outputs only the middle 32 bits, among the generated 64-bit Walsh codes, in the form of a 1 bit stream.

The first sub-frequency selective spreader 510 includes a 6-bit counter 511, six XOR logic circuits 512-1 to 512-5 and 514, six AND logic circuits 513-1 to 513-6, has three frequency selective control bits (s2, and s0) and three input bits b8, b7, and b6.

The 6-bit counter 511 is reset to an initial value 16 at every symbol period in order to count 16 to 47 in the high performance mode.

One of the eight Walsh codes included in a corresponding sub-group is generated by using the three frequency selective control bits s2, s1, and s0 and the three input bits b8, b7, and b6, and b8 and output in the form of a 1 bit stream (A).

The five XOR logic circuits 512-1 to 512-5 are used for gray indexing. The six AND logic circuits 513-1 to 513-6 receive $C_5$ to $C_0$, the output from the 6-bit counter 511, s2, the most significant bit (MSB) of the frequency selective control bits, and output bits of the five XOR logic circuits 512-1 to 512-5. Also, the one XOR logic circuit 514 is to XOR outputs from the six AND logic circuits 513-1 to 513-6.

The frequency selective digital transmission apparatus in the high performance mode as described above with reference to FIGS. 6 to 8 may be also used in the general mode or low power mode, as well as in the high performance mode.

Also, the structure of the frequency selective spreaders 217 in FIGS. 4 and 7 are illustrated to be different to explain the difference between the high performance mode and the general mode, but in an actual implementation, they may be integrated into a single structure by using control signals.

Also, the frequency selective spreader 217 may be replaced by a frequency selective spreader that has a different structure but obtains the same outputs as those of the frequency selective spreaders illustrated in FIGS. 4 and 7, upon receiving N bits output from the S2P 216.

Also, the configuration including the high speed frequency selective spreader 500, the low speed frequency selective spreader 600, and the multiplexer 700 in the frequency selective spreader 217 illustrated in FIGS. 4 and 7 according to exemplary embodiments of the present invention may be implemented so as to have one or more frequency selective spreaders supporting diverse data rates ranging from a low speed to a high speed. In this case, in order to support the diverse transfer rates ranging from a low speed to a high speed, the number of output bits, output after being spread by the frequency selective spreaders, per output symbol of the S2P input to the frequency selective spreaders, namely, spreading factors, is adjusted and transmitted.

As set forth above, according to exemplary embodiments of the invention, one of a high performance mode, a general mode, and a low power mode is selected according to a symbol rate and a clock in use varying according to various applications, and one of a high speed spreading scheme employing a frequency selective spreader having a multi-structure providing a high data transmission efficiency and a low speed spreading scheme having a transmission performance superior to a transmission efficiency is selectively used in each mode, whereby the human body communication system can be optimized by each application to provide higher quality and to be operable at a low power level.

While the present invention has been shown and described in connection with the exemplary embodiments, it will be apparent to those skilled in the art that modifications and variations can be made without departing from the spirit and scope of the invention as defined by the appended claims.

What is claimed is:

1. A frequency selective digital transmission apparatus comprising:
    a preamble transmission processing unit generating a preamble for frame synchronization and spreading the generated preamble with a predetermined spreading code;
    a header transmission processing unit configuring a header including data attribute information and spreading the header with a predetermined spreading code;
    a data transmission processing unit performing serial-to-parallel conversion on transmission data according to a selected transmission mode and a spreading scheme and spreading the serial-to-parallel converted transmission data with a frequency selective spreading code; and
    a multiplexing unit multiplexing the preamble, the header, and the transmission data which have been spread by the preamble transmission processing unit, the header transmission processing unit and the data transmission processing unit, respectively, and transmitting the preamble, the header, and the transmission data as digital signals.

2. The apparatus of claim 1, wherein the data transmission processing unit divides 2N (N is a real number) number of spreading codes by 2M (M is a real number and M<N) to generate a plurality of sub-groups, and selectively uses P (P is a real number) number of sub-groups among the plurality of generated sub-groups.

3. The apparatus of claim 2, wherein the data transmission processing unit comprises:
    a serial-to-parallel converter performing serial-to-parallel conversion on the transmission data at a pre-set rate; and
    a frequency selective spreader receiving an output from the serial-to-parallel converter and spreading the transmission data according to one selected from among a high speed spreading scheme and a low speed spreading scheme.

4. The apparatus of claim 3, wherein the frequency selective spreader comprises:
    a high speed frequency selective spreader spreading the transmission data according to the high speed spreading scheme;
    a low speed frequency selective spreader spreading the transmission data according to the low speed spreading scheme; and
    a multiplexer selectively outputting one of output values of the high speed frequency selective spreader and the low speed frequency selective spreader according to the selected spreading scheme.

5. The apparatus of claim 4, wherein when the high speed spreading scheme is selected, the serial-to-parallel converter converts the transmission data into parallel data of P*(M+1) bits and outputs the same, and
    wherein the high speed frequency selective spreader comprises:
    P number of sub-frequency selective spreaders receiving (M+1) number of data bits from the serial-to-parallel converter and selecting one spreading code from a corresponding sub-group by using M number of data bits, and XORing the remaining one data bit to the selected value to acquire a spreading code; and
    a majority value selection unit selecting a majority value from the P number of spreading codes acquired by the P number of sub-frequency selective spreaders, respectively.

6. The apparatus of claim 4, wherein when the high speed spreading scheme is selected, the serial-to-parallel converter converts the transmission data into parallel data of P*M bits and outputs the same, and
    wherein the high speed frequency selective spreader comprises:
    P number of sub-frequency selective spreaders selecting one spreading code from a corresponding sub-group by using M number of data bits received from the serial-to-parallel converter; and
    a majority value selection unit selecting a majority value from P number of spreading codes selected by the P number of sub-frequency frequency selective spreaders, respectively.

7. The apparatus of claim 4, wherein when the low speed spreading scheme is selected, the serial-to-parallel converter converts the transmission data into parallel data of S+(M+1) bits and outputs the same, and
    wherein the low speed frequency selective spreader comprises:
    Q number of sub-frequency selective spreaders receiving (M+1) number of data bits from the serial-to-parallel converter and selecting one spreading code from a corresponding sub-group by using M number of data bits, and XORing the remaining one data bit to the selected value to acquire a spreading code; and
    a multiplexer selecting one spreading code by using the remaining S number of data bits from the Q number of spreading codes acquired by the Q number of sub-frequency selective spreaders, respectively.

8. The apparatus of claim 4, wherein when the low speed spreading scheme is selected, the serial-to-parallel converter converts the transmission data into parallel data of S+M bits and outputs the same, and     wherein the low speed frequency selective spreader comprises:

Q number of sub-frequency selective spreaders selecting one spreading code from a corresponding sub-group by using M number of data bits received from the serial-to-parallel converter; and     a multiplexer selecting one spreading code by using the remaining S number of data bits from Q number of spreading codes selected by the Q number of sub-frequency frequency selective spreaders, respectively.

9. The apparatus of claim 1, wherein the data transmission processing unit operates at a different clock and different symbol rate according to a transmission mode selected from among the general mode, the low power mode, and the high performance mode.

10. The apparatus of claim 9, wherein when the high performance mode is selected, the data transmission processing unit uses only a portion of output bits of the frequency selective spreading codes.

11. The apparatus of claim 10, wherein when the number of output bits of the frequency selective spreading codes is N, the data transmission processing unit uses N/2 number of bits positioned in the middle.

12. The apparatus of claim 3, wherein the data transmission processing unit supports various transmission rates by adjusting the number of output bits of the frequency selective spreader per output symbol of the serial-to-parallel converter.

13. A frequency selective digital transmission apparatus comprising:

a preamble transmission processing unit generating a preamble for frame synchronization and spreading it with a predetermined spreading code;

a header and data transmission processing unit performing serial-to-parallel conversion on a header and transmission data including data attribute information and spreading the serial-to-parallel converted header and transmission data with a frequency selective spreading code according to a selected transmission mode and a spreading scheme; and     a multiplexing unit multiplexing the preamble, the header, and the transmission data which have been spread by the preamble transmission processing unit and the header and data transmission processing, respectively, and transmitting the preamble, the header, and the transmission data as digital signals.

* * * * *